(12) United States Patent
Mongia et al.

(10) Patent No.: US 9,684,379 B2
(45) Date of Patent: Jun. 20, 2017

(54) COMPUTING SYSTEM UTILIZING COORDINATED TWO-HAND COMMAND GESTURES

(75) Inventors: Rajiv Mongia, Fremont, CA (US); Achintya Bhowmik, Cupertino, CA (US); Mark Yahiro, Santa Clara, CA (US); Dana Krieger, Emeryville, CA (US); Ed Mangum, San Mateo, CA (US); Diana Povieng, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 326 days.

(21) Appl. No.: 13/997,634

(22) PCT Filed: Dec. 23, 2011

(86) PCT No.: PCT/US2011/067290
§ 371 (c)(1),
(2), (4) Date: Jun. 24, 2013

(87) PCT Pub. No.: WO2013/095679
PCT Pub. Date: Jun. 27, 2013

(65) Prior Publication Data
US 2014/0208275 A1 Jul. 24, 2014

(51) Int. Cl.
*G06F 3/048* (2013.01)
*G06F 3/01* (2006.01)
(Continued)

(52) U.S. Cl.
CPC .............. *G06F 3/017* (2013.01); *G06F 3/011* (2013.01); *G06F 3/0304* (2013.01); *G06F 3/0482* (2013.01); *G06F 3/04842* (2013.01)

(58) Field of Classification Search
None
See application file for complete search history.

(56) References Cited

U.S. PATENT DOCUMENTS 5,581,670 A * 12/1996 Bier ...................... G06F 3/0481
345/629
5,594,469 A 1/1997 Freeman et al.
(Continued)

FOREIGN PATENT DOCUMENTS

CA 2768893 2/2011
TW 393629 6/2000
(Continued)

OTHER PUBLICATIONS

Office Action including Search Report, dated Sep. 23, 2014 (+ English translation), in Taiwan Patent Application No. 101146399, 19 pages.
(Continued)

*Primary Examiner* — Hua Lu
(74) *Attorney, Agent, or Firm* — Blakely, Sokoloff, Taylor & Zafman LLP

(57) ABSTRACT

A computing system utilizing coordinated two-hand command gestures. An embodiment of an apparatus includes a sensing element to sense a presence or movement of a user of the apparatus, including the sensing of command gestures by the user to provide input to the apparatus, a processor, wherein operation of the processor includes interpretation of the command gestures of the user and the implementation of actions in response to the command gestures, and a display screen to display elements to the user, where the display screen may display one or more elements use in command gestures, where command gestures include coordinated two-hand command gestures of the user.

21 Claims, 14 Drawing Sheets

(51) Int. Cl.
  *G06F 3/03* (2006.01)
  *G06F 3/0482* (2013.01)
  *G06F 3/0484* (2013.01)

(56) References Cited

U.S. PATENT DOCUMENTS

| | | | |
|---|---|---|---|
| 6,222,465 B1 | 4/2001 | Kumar et al. | |
| 7,030,861 B1 | 4/2006 | Westerman et al. | |
| 7,274,803 B1* | 9/2007 | Sharma | G06K 9/00375 348/14.15 |
| 7,519,223 B2* | 4/2009 | Dehlin | G06F 3/0354 345/173 |
| 7,598,942 B2 | 10/2009 | Underkoffler et al. | |
| 7,849,421 B2 | 12/2010 | Yoo et al. | |
| 7,924,271 B2 | 4/2011 | Christie et al. | |
| 8,181,123 B2 | 5/2012 | Stone-Perez et al. | |
| 8,333,661 B2 | 12/2012 | Ng | |
| 8,334,842 B2 | 12/2012 | Markovic et al. | |
| 8,448,083 B1 | 5/2013 | Migos et al. | |
| 8,693,724 B2 | 4/2014 | Ahmed et al. | |
| 8,830,227 B2 | 9/2014 | Rais | |
| 8,982,182 B2 | 3/2015 | Shpunt | |
| 9,002,099 B2 | 4/2015 | Litvak | |
| 9,098,931 B2 | 8/2015 | Shpunt | |
| 9,171,200 B2 | 10/2015 | Subramanian | |
| 9,189,825 B2* | 11/2015 | Im | G06T 1/0007 |
| 2002/0064382 A1* | 5/2002 | Hildreth | G06K 9/00375 396/100 |
| 2003/0076293 A1 | 4/2003 | Mattsson | |
| 2005/0003851 A1 | 1/2005 | Chrysochoos et al. | |
| 2006/0026521 A1* | 2/2006 | Hotelling | G06F 3/0418 715/702 |
| 2006/0031786 A1 | 2/2006 | Hillis et al. | |
| 2006/0036944 A1 | 2/2006 | Wilson | |
| 2006/0132432 A1* | 6/2006 | Bell | G06F 3/011 345/156 |
| 2006/0187196 A1 | 8/2006 | Underkoffler et al. | |
| 2006/0209021 A1* | 9/2006 | Yoo | G06F 3/017 345/156 |
| 2008/0005703 A1 | 1/2008 | Radivojevic | |
| 2008/0036732 A1* | 2/2008 | Wilson | G06F 3/017 345/156 |
| 2008/0052643 A1* | 2/2008 | Ike | G06F 3/017 715/863 |
| 2008/0120577 A1* | 5/2008 | Ma | G06F 3/0325 715/863 |
| 2008/0231926 A1* | 9/2008 | Klug | H04N 13/0425 359/23 |
| 2009/0217211 A1* | 8/2009 | Hildreth | G06F 3/017 715/863 |
| 2010/0031202 A1* | 2/2010 | Morris | G06F 3/04883 715/863 |
| 2010/0031203 A1 | 2/2010 | Morris et al. | |
| 2010/0045705 A1* | 2/2010 | Vertegaal et al. | 345/661 |
| 2010/0060722 A1 | 3/2010 | Bell | |
| 2010/0199232 A1* | 8/2010 | Mistry | G06F 1/163 715/863 |
| 2010/0280988 A1 | 11/2010 | Underkoffler et al. | |
| 2010/0281436 A1 | 11/2010 | Kipman et al. | |
| 2010/0281437 A1 | 11/2010 | Stone-Perez et al. | |
| 2010/0303289 A1 | 12/2010 | Polzin | |
| 2011/0102570 A1* | 5/2011 | Wilf | G06F 3/017 348/77 |
| 2011/0115702 A1* | 5/2011 | Seaberg | G06F 3/017 345/156 |
| 2011/0119640 A1* | 5/2011 | Berkes | G06F 3/011 715/863 |
| 2011/0197263 A1* | 8/2011 | Stinson, III | 726/4 |
| 2011/0219340 A1 | 9/2011 | Pathangay et al. | |
| 2011/0221669 A1 | 9/2011 | Shams et al. | |
| 2011/0258537 A1 | 10/2011 | Rives et al. | |
| 2011/0283212 A1* | 11/2011 | Warner | G06F 3/0488 715/769 |
| 2011/0289455 A1* | 11/2011 | Reville | G06F 3/017 715/830 |
| 2011/0296353 A1 | 12/2011 | Ahmed et al. | |
| 2012/0051588 A1 | 3/2012 | McEldowney | |
| 2012/0084688 A1* | 4/2012 | Robert | G06F 3/04817 715/769 |
| 2012/0119988 A1* | 5/2012 | Izumi | G06F 3/017 345/156 |
| 2012/0169670 A1 | 7/2012 | Kim et al. | |
| 2012/0235903 A1* | 9/2012 | Im | G06F 3/005 345/158 |
| 2012/0249741 A1* | 10/2012 | Maciocci | G06F 3/011 348/46 |
| 2013/0106898 A1 | 5/2013 | Saint-Loubert-Bi et al. | |
| 2013/0154919 A1* | 6/2013 | Tan | G01S 15/50 345/156 |

FOREIGN PATENT DOCUMENTS

| | | |
|---|---|---|
| TW | M294069 | 7/2006 |
| TW | 201037577 | 10/2010 |
| TW | 201120681 | 6/2011 |
| TW | 201137766 | 11/2011 |
| WO | WO-2011/066343 | 6/2011 |
| WO | WO-2011066343 | 6/2011 |

OTHER PUBLICATIONS

Office Action mailed Dec. 5, 2014, in U.S. Appl. No. 13/997,978, 6 pages.
Official Letter dated Jul. 28, 2014 (+ English translation), in R.O.C. (Taiwanese) Patent Application No. 101149340, 13 pages.
Notice of Allowance mailed Mar. 30, 2015, in U.S. Appl. No. 13/997,978, 7 pages.
Office Action dated Feb. 24, 2015 (+ English translation), in Taiwan Patent Application No. 101147201, 15 pages.
Office Action mailed Mar. 27, 2015, in U.S. Appl. No. 13/997,640, 17 pages.
Official Letter dated Mar. 2, 2015 (+ English translation), in Taiwan Patent Application No. 101145913, 16 pages.
International Search Report and Written Opinion of the International Searching Authority mailed Aug. 28, 2012, in International Patent Application No. PCT/US2011/067280, 10 pages.
International Search Report and Written Opinion of the International Searching Authority mailed Aug. 28, 2012, in International Patent Application No. PCT/US2011/067287, 10 pages.
International Search Report and Written Opinion of the International Searching Authority mailed Aug. 28, 2012, in International Patent Application No. PCT/US2011/067289, 10 pages.
International Search Report and Written Opinion of the International Searching Authority mailed Aug. 28, 2012, in International Patent Application No. PCT/US2011/067290, 10 pages.
Decision of Rejection dated Jun. 16, 2015 (+ English translation), in Taiwan Patent Application No. 101147201, 8 pages.
Extended European Search Report dated Jul. 22, 2015, in European Patent Application No. 11878127.7, 6 pages.
Final Office Action mailed Jul. 21, 2015, in U.S. Appl. No. 13/997,640, 19 pages.
Notice of Allowance mailed Jul. 22, 2015, in U.S. Appl. No. 13/997,978, 8 pages.
Office Action mailed Jun. 12, 2015, in U.S. Appl. No. 13/997,639, 14 pages.
Office Action mailed Dec. 24, 2015, in U.S. Appl. No. 13/997,639, 12 pages.
Final Office Action U.S. Appl. No. 13/997,639 mailed on May 16, 2016, 13 pages.
Allowance Decision and Search Report (+ Search Report in English Translation) in Taiwanese Patent Application No. 101147201 mailed Jun. 26, 2016, 4 pages.
Office Action U.S. Appl. No. 13/997,640 mailed Apr. 22, 2016, 13 pages.
Final Office Action for U.S. Appl. No. 13/997,640, mailed Aug. 10, 2016, 14 pages.

(56) References Cited

OTHER PUBLICATIONS

Advisory Action for U.S. Appl. No. 13/997,640 mailed Nov. 4, 2016, 9 pgs.
Notice of Allowance (+ English Translation) for Taiwanese Application No. 101149340 mailed Nov. 27, 2014, 3 pages
International Preliminary Report on Patentability for International Patent Application No. PCT/US2011/067280 mailed Jul. 3, 2014, 7 pages.
International Preliminary Report on Patentability for International Patent Application No. PCT/US2011/067287 mailed Jul. 3, 2014, 7 pages.
International Preliminary Report on Patentability for International Patent Application No. PCT/US2011/067289 mailed Jul. 3, 2014, 7 pages.
International Preliminary Report on Patentability for International Patent Application No. PCT/US2011/067290 mailed Jul. 3, 2014, 7 pages.
Notice of Allowance (+ English Translation) in Taiwanese Patent Application No. 101224916 mailed Oct. 22, 2013, 4 pages.
Notice of Allowance for U.S. Appl. No. 13/997,639, mailed Nov. 8, 2016, 14 pages.

* cited by examiner

US 9,684,379 B2

COMPUTING SYSTEM UTILIZING COORDINATED TWO-HAND COMMAND GESTURES

CROSS-REFERENCE TO RELATED APPLICATION

This application is a national phase of PCT/US2011/067290 filed Dec. 23, 2011, which application is incorporated herein by reference in its entirety.

TECHNICAL FIELD

Embodiments of the invention generally relate to the field of computing systems and, more particularly, to a computing system utilizing coordinated two-hand command gestures.

BACKGROUND

Computing systems and related systems are being developed to provide a more natural interface for users. In particular, computing systems may include sensing of a user of the computing system, where user sensing may include gesture recognition, where the system attempts to recognize one or more command gestures of a user, and in particular hand gestures of the user.

Certain operations in a computing system regard multiple elements, aspects, or dimensions that require handling at the same time. A conventional computing system may handle such multiple concepts through use of multiple inputs or other mechanisms that allow multiple simultaneous inputs.

However, conventional gestures do not provide a natural and intuitive manner of addressing these multiple inputs, which may result in a user being forced to abandon gesture inputs for conventional computer input devices in order address the multiple elements, aspects, or dimensions.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
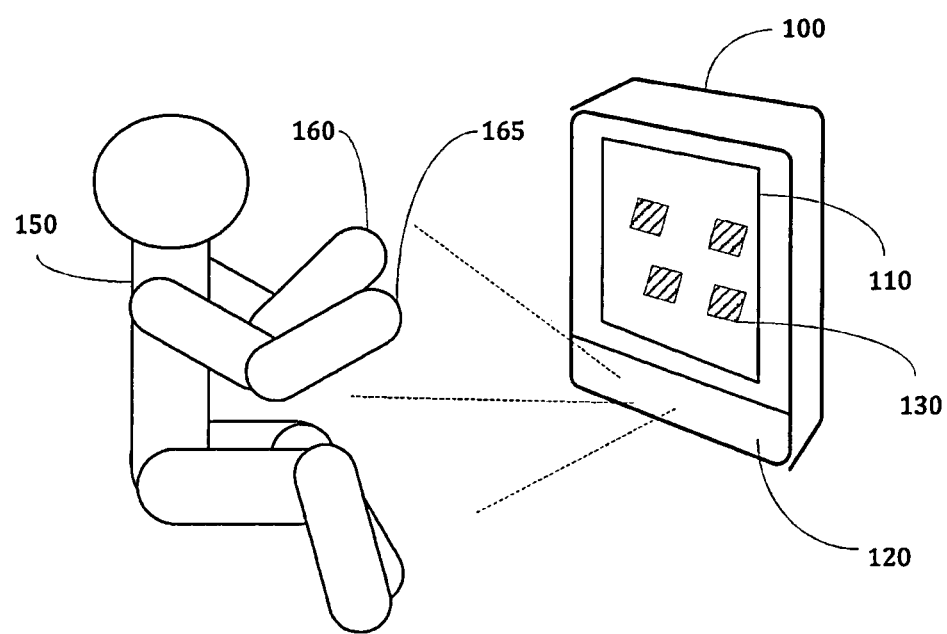
FIG. 1 illustrates an embodiment of a computing system including a mechanism to provide feedback to users regarding presentation of command gestures.

Embodiments of the invention are generally directed to a mechanism to provide feedback regarding computing system command gestures.

As used herein:

"User sensing" means a computer operation to sense a user. The sensing of a user may include position and motion detection, such as a computing system detecting and interpreting gestures made by a user of the computing system as inputs to the computing system. User sensing may utilize any technology by which the user may be sensed by the computing, including visual sensing (using one or more cameras or similar devices), audio sensing (including detection of sounds and detection of sound reflection), heat or infrared sensing, sensing and interpretation of projected light patterns (visible or invisible), and other technologies. User sensing may include operations of a perceptual computing system in sensing user operations and intent, where a perceptual computing system is a system allowing for the addition of alternative input modalities, including gesture recognition.

"Computing system" means any device or system that includes computing capability. A computing system includes both a single unit and a system of multiple elements. A computing system is not limited to a general-purpose computer, but also includes special purpose devices that include computing capability. A "computing system" includes a desktop computer, a game console, a laptop or notebook computer, an all-in-one (AIO) computer, a tablet computer, a handheld computing device including a smart phone, or other apparatus or system having computing and display capability.

In a computing system utilizing user sensing to detect system inputs, gestures made by a user to communicate with the computing system (which may be referred to generally as command gestures) may be difficult for the user to control if the operation involves more than the user can reasonably control or direct using a single hand in performing a command gesture.

In some embodiments, a computing system operates to detect and utilize coordinated two-hand command gestures, wherein a command gesture may be either a gesture where a first hand provides a first operation or function to place the system in a first state with regard to the computing system and a second hand provides a second coordinated operation or function in the first state, or a single-action two-hand gesture where the two hands conduct a gesture simultaneously to provide a request for a certain operation or function.

When humans use two hands in everyday life, one hand tends to be dominant and the other non-dominant. Typically, the non-dominant hand is used for rough placement/activities and the dominant hand is used for fine detail work. For example, when peeling a potato, the non-dominant hand is used to hold the potato and the dominant hand is used to actually peel the potato (the peeling action requires more dexterity and fine-grain control and therefore is conducted by the dominant hand). A second example is a watchmaker—the non-dominant hand may be used to hold the watch in the proper orientation whereas the dominant hand is used to do the fine assembly work within the watch.

In some embodiments, this framework is applied to the case of certain two-hand command gestures for a computing system. In some embodiments, a command gesture received by a computing system includes a first operation by a first hand and a second operation by a second hand, where the first operation and the second operation are coordinated. In some embodiments, rather than both hands being used in the same way, a first (non-dominant) hand is used for "rough" work and a second (dominant) hand is used for "detail" and/or "selection" work. In other embodiments, the two hands may generate a cooperative gesture in which both hands simultaneously provide a certain gesture. However, embodiments are not limited to use of a particular hand by a user in performing any part of a command gesture.

In an example, in the event that an element (where the element may be a file, application, app, or other element) is open and there is a need for selection and copying of a particular section or portion of the screen, a two-hand command gesture approach may be utilized. In some embodiments, a first hand of the user (such as the non-dominant hand of the user) is used with the thumb and index finger in a pinning position by having the two fingers placed in a wide-open position. This operation pins the screen at the current position (such that there is no scrolling or movement) so that a selection can be conducted effectively (analogous to the user using the hand to hold the screen in place). The second hand of the user (such as the dominant hand of the user) may then be used to conduct detail work such as selection, copy, paste, or other function in relation to a selected element, which are discussed further below.

In some embodiments, an apparatus includes a sensing element to sense a presence or movement of a user of the apparatus, including the sensing of command gestures by the user to provide input to the apparatus, a processor, wherein operation of the processor includes interpretation of the command gestures of the user and the implementation of actions in response to the command gestures, and a display screen to display elements to the user, where the display screen may display one or more elements use in command gestures, where command gestures include coordinated two-hand command gestures of the user.

In some embodiments, a method includes detecting a presence of a user by a computing system; detecting a command gesture of the user for the computing system, wherein the command gesture is a two-hand gesture; and interpreting the command gesture. In some embodiments, if the command gesture is a simultaneous two-hand gesture, the gesture is interpreted as a single action two-hand gesture; and wherein if the command gesture is a first gesture by a first hand followed by a second gesture by a second hand, then the command gesture is interpreted as a coordinated two-hand gesture.

FIG. 1 illustrates an embodiment of a computing system including a mechanism to provide feedback to users regarding presentation of command gestures. In some embodiments, a computing system 100 includes a display screen to 110 to provide feedback to a user 150 regarding command gestures being performed by the user. In some embodiments, the computing system 100 including one or more sensing elements 120 to sense position and movement of the user 150. Sensing elements may include multiple different elements working together, working in sequence, or both. For example, sensing elements may include elements that provide initial sensing, such as light or sound projection, following by sensing for gesture detection by, for example, an ultrasonic time of flight camera or a patterned light camera.

In particular, the sensing elements 120 may detect movement and position of the hands (first hand 160 and second hand 165) of the user 150. In some embodiments, the system 100 is operable to utilize coordinated two-hand command gestures of the user 150 in providing command with regard to elements 130 provided on the display screen 110. For example, the user may use the first hand 160 to perform a first action, such as pinning the screen, switching a view of the display screen, or establishing a search for an element on the display screen, and use the second hand 165 to perform further action, such as selecting an element, moving an element, or other such action. In some embodiments, the computing system may learn the actions of a particular user such that it anticipates which hand the user will use as his dominant and non-dominant hand. In some embodiments, the computing system is able to achieve this by utilizing face recognition in order to identify the user.

Figure 2:
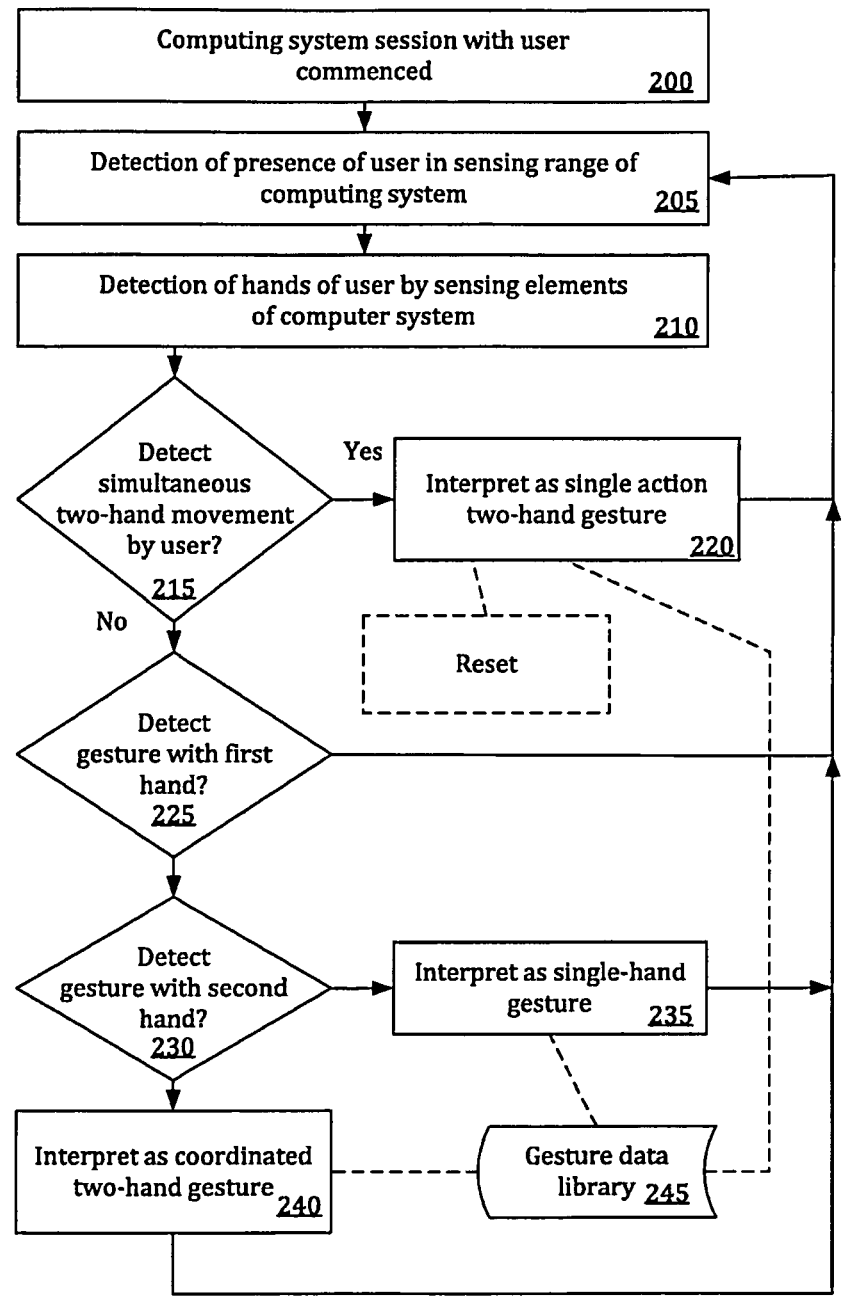
FIG. 2 is a flowchart to illustrate an embodiment of a process for handling coordinated two-hand command gestures in a computing system.

FIG. 2 is a flowchart to illustrate an embodiment of a process for handling coordinated two-hand command gestures in a computing system. In some embodiments, a computing system session with a user is commenced 200, there is detection if the presence of the user in a sensing range of the computing system 205 (where being in sensing range includes being in range of the computing system viewing, hearing, or otherwise sensing the user), and detection of the hands of the user by the sending elements of the computer system 210.

In some embodiments, if a simultaneous two-hand command gesture is detected 215 (such as two fists or two open palms towards the computing system), the command gesture may be interpreted as a single action, such as a reset command 220.

In some embodiments, if a gesture with a first hand is detected 225 but a gesture with a second hand is not detected 230, then the gesture may be interpreted as a conventional single-hand command gesture 235. If a second hand command gesture is detected 230, then the command gesture may be interpreted as a two-hand command gesture where the first hand and the second hand are used cooperatively in an operation of the computing system 240. In some embodiments, the interpretation of the gestures is based on gesture data library 245, where the gesture data library includes data regarding coordinated two-hand command gestures.

Figure 3:
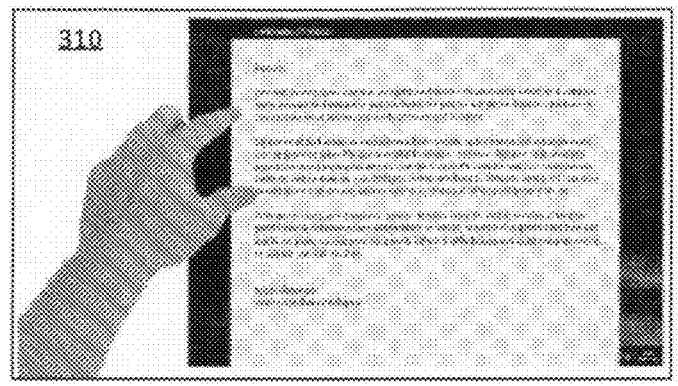
FIG. 3 illustrates an embodiment of an apparatus or system utilizing coordinated two-hand command gestures for pinning and selecting.
Figure 3:
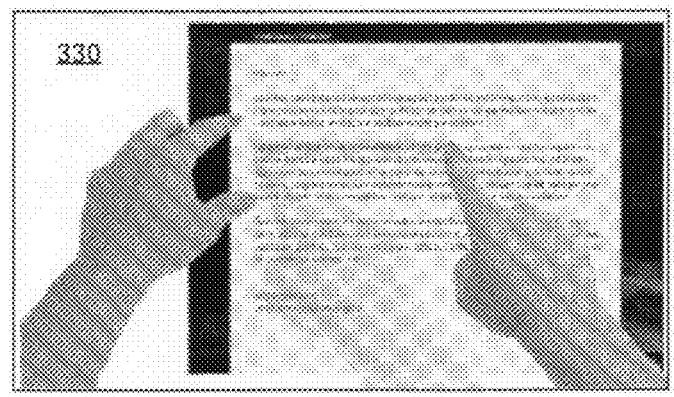

FIG. 3 illustrates an embodiment of an apparatus or system utilizing coordinated two-hand command gestures for pinning and selecting. In this illustration, a first (non-dominant) hand operates to pin the display screen to put the system into a state to maintain the position of text or other items on the display screen 310. In some embodiments, once the first hand has pinned the screen, the computing system is in the condition or state for selection, cut, paste, and similar functions. In some embodiments, in this condition or state, when the index finger for the second hand is pointed toward the screen, this indicates that the user is attempting to conduct a selection 330, and thus an icon appears on the screen to indicate the "cursor location" of where the user is pointing. As the finger moves, either a "starting cursor location" is indicated or a pre-associated item (such as hyperlinks, photos, web addresses, phone numbers, street addresses, predetermined formal names, or other data) is highlighted. In other implementations, an object may be pinned or held with a first hand to allow for detailed or fine entries into an area by the second hand, such as, for example, pinning a portion of a drawing or other image to allow the user to draw details in the pinned portion.

In some embodiments, in order to select an item, the user moves the user's finger forward toward the screen to indicate a selection. Alternatively, the user may bend his finger at the knuckle to indicate a selection. In some embodiments, in order to select a section of text, the user may move the user's finger toward the screen to indicate the start of the selection, move parallel to the screen in order to determine the section to be selected, and then move the user's finger away from the screen. Alternatively, the user can bend his finger at the knuckle to indicate the start of the selection, can move the finger to the end of the section, and then bend his finger at the knuckle again. During such selection actions, the first hand remains in the "pinning" position.

Figure 4:
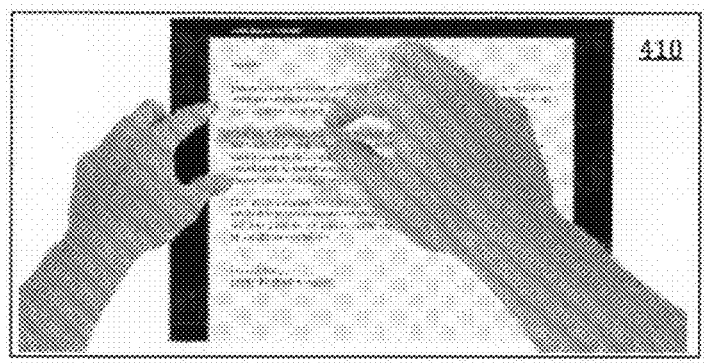
FIG. 4 illustrates an embodiment of an apparatus or system utilizing coordinated two-hand command gestures for grasping and moving.
Figure 4:
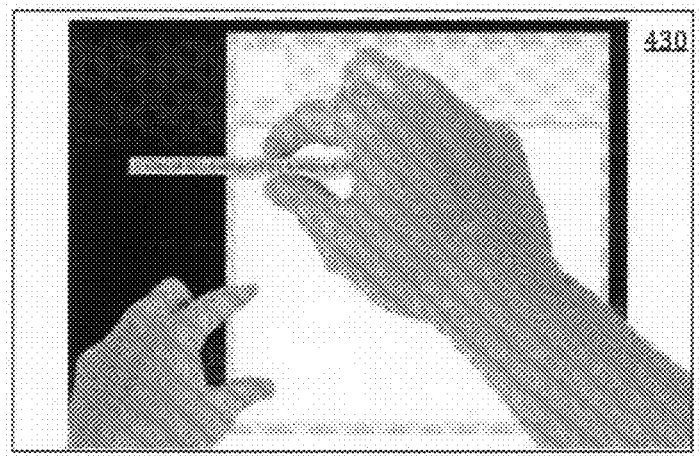

FIG. 4 illustrates an embodiment of an apparatus or system utilizing coordinated two-hand command gestures for grasping and moving. In some embodiments, once an item (such as portion of text) is selected, and while still having a first hand in the "pinning" position, a grasping or "Claw-hand" gesture 410 (where the thumb and one or more fingers are placed in a position) of the second (dominant) hand can be used to grab the selected portion of the screen 430. In some embodiments, the Claw-hand may be moved away from the screen in order to copy the selected text into a virtual clipboard that appears to float above the content on the screen. In some embodiments, the floatation effect may be achieved through the use of 3D display/glasses, parallax/perspective on a 2D screen, use of a different color, making the section of text partially transparent, surrounding the selected section in a partially transparent colored box, or any combination of the above. Alternatively, the virtual clipboard may exist toward the sides, top, or bottom of the screen, or a combination of such locations, in pre-determined sections or virtual-drawers. In some embodiments, the virtual clipboard position is such that it is accessible in multiple programs/web browsers/App environments to facilitate sharing of the clipboard information in multiple ways. Because items in the clipboard are placed virtually around various sections of the computing environment, multiple items may be contained simultaneously in the clipboard—separated by their "location".

In some embodiments, once an item has been selected and placed within the clipboard, the first hand can discontinue the "pin" gesture. In some embodiments, other gestures, button presses, or touch points can now be used to continue navigation within the computing system environment. In some embodiments, during the navigation, the items in the clipboard remain either floating above the screen or in the virtual-drawers around the screen—ready to be used when and if needed.

Figure 5:
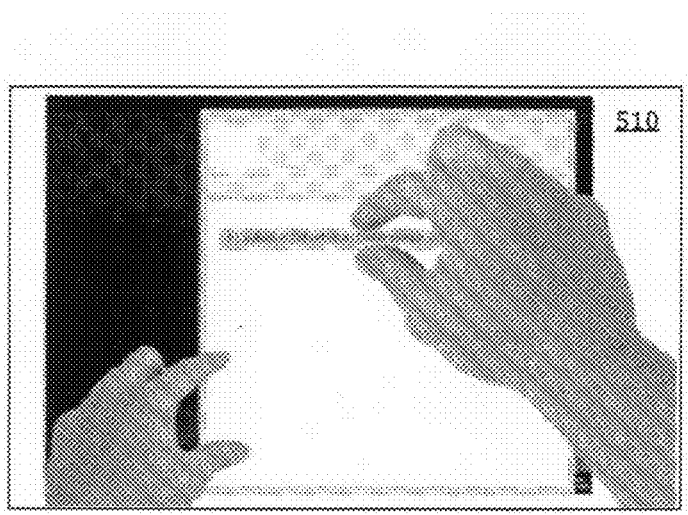
FIG. 5 illustrates an embodiment of an apparatus or system utilizing coordinated two-hand command gestures for moving or copying and placing.
Figure 5:
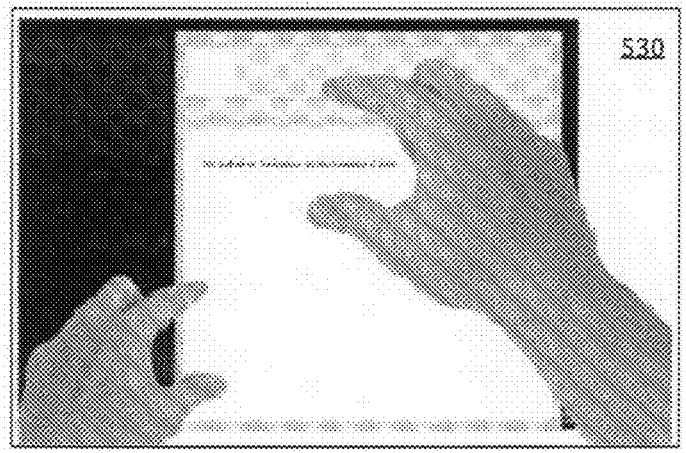

FIG. 5 illustrates an embodiment of an apparatus or system utilizing coordinated two-hand command gestures for moving or copying and placing. In some embodiments, when in a program, application, or file, it may be desired to use the contents of the clipboard. In some embodiments, a "pinning" gesture is made with a first hand, indicating to the computing system that the user intends to be in a selection/copy/paste environment. Once in the pinned environment, the user may perform a Claw-hand 510 with the second hand, where the Claw-hand reaches one of the items in the clipboard. In some embodiments, a selected item will be highlighted and appear to move up toward the Claw-icon on the screen. If the correct item has been highlighted, the user may close or squeeze the user's Claw-hand gesture in order to grab the item. Once the item has been grabbed, the user may move the item to the correct place on the screen to which the user wants to place the item. In some embodiments, to place the item in a particular location, the user may open the Claw-hand gesture (to release the selected icon) 530. In some embodiments, alternatively, the user may be required to move the user's Claw-hand gesture toward the screen and then confirm by opening the user's Claw-hand (to drop or place the selected icon). Examples of such an activity may be a user sending a photo to an email recipient, or a user placing a hyperlink in a status update on a social networking site.

In the above-described embodiments, the user is in an environment where both hands are available for conducting the gestures (both the dominant and non-dominant hands). In some circumstances or with some computing devices, the first (non-dominant) hand may be required for stabilizing or holding the computing device. For example, in the case of a tablet or other mobile device, the first hand may be holding the device and will not be available to perform the "pin" gesture. In some embodiments, an apparatus or system includes a "pin-button" that is conveniently placed on the device in the gripping position. In some embodiments, the first hand gripping the device can perform the pinning action while still holding or stabilizing the device, allowing the second, dominant hand to perform the manipulation gesture.

Figure 6:
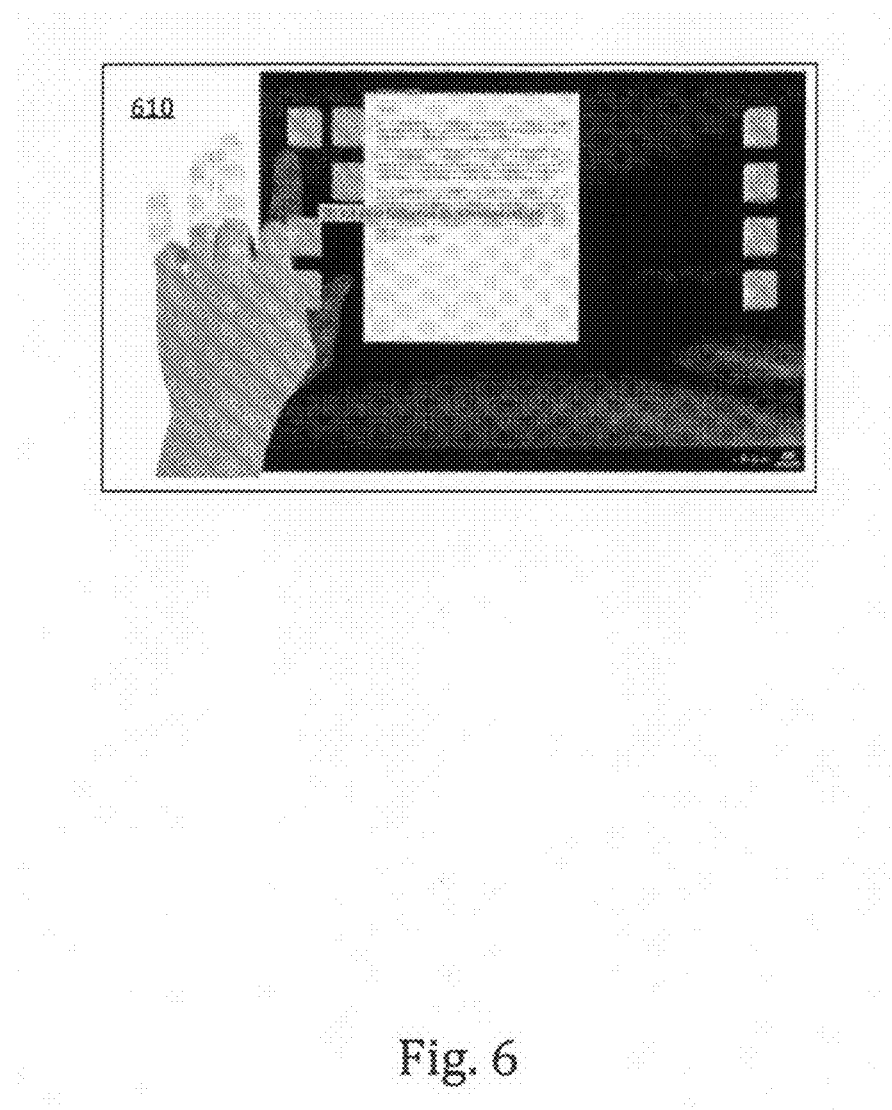
FIGS. 6-8 illustrate an embodiment of an apparatus or system utilizing coordinated two-hand command gestures for switching view or operation.
Figure 7:
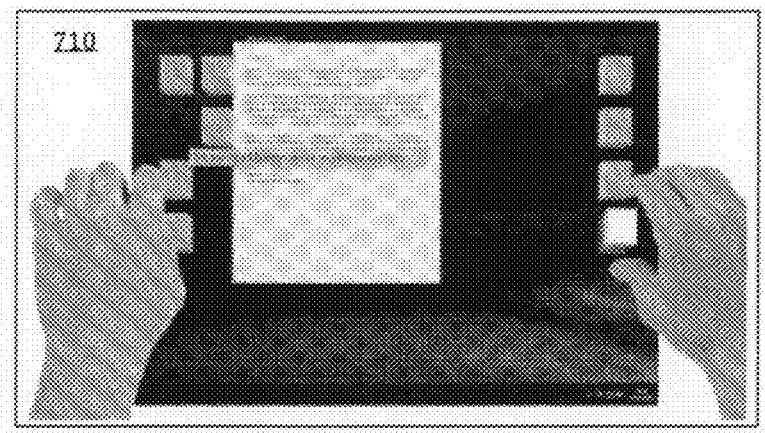
Figure 7:
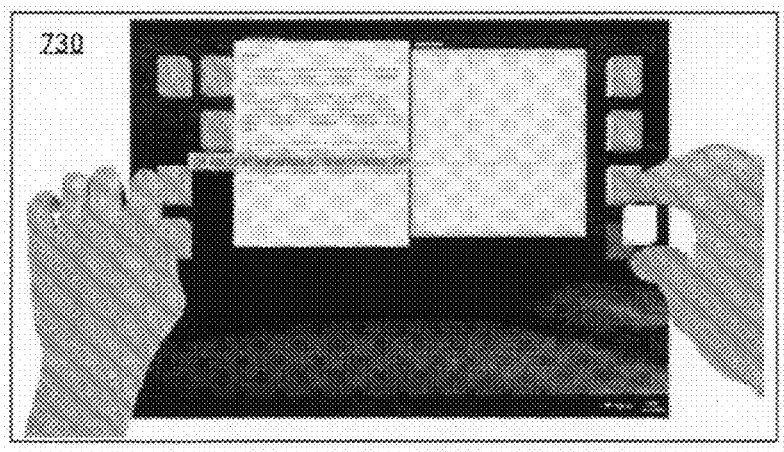
Figure 8:
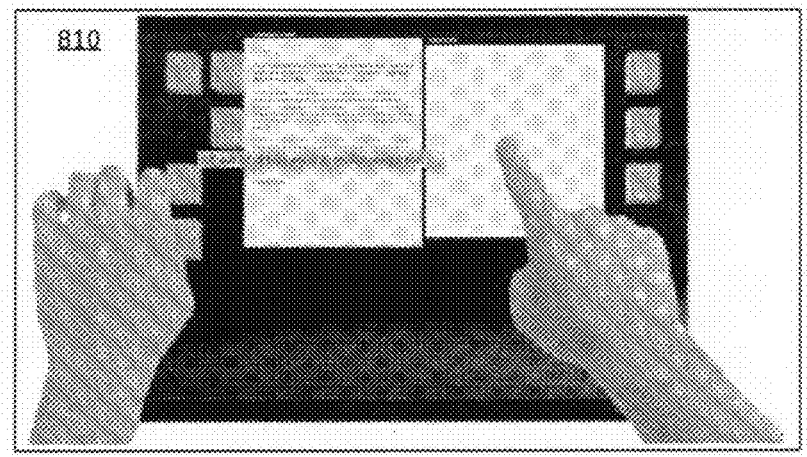
Figure 8:
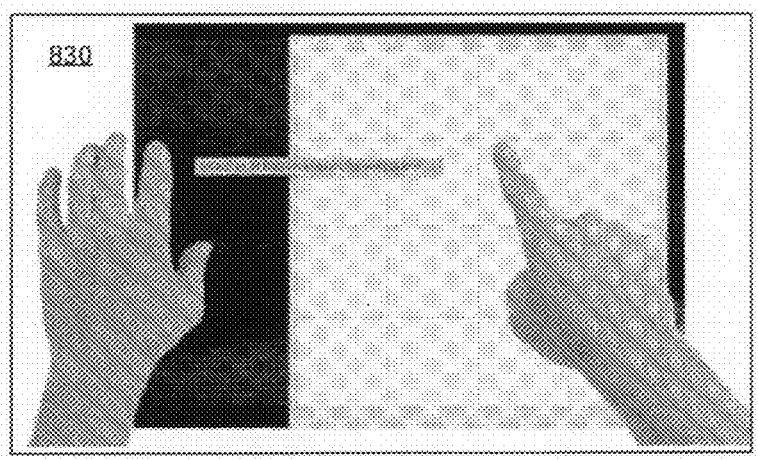

FIGS. 6-8 illustrate an embodiment of an apparatus or system utilizing coordinated two-hand command gestures for switching view or operation. In some embodiments, a first single-action two-hand gesture utilizes a "Finger Crunch" gesture (610 in FIG. 6) in order to place the apparatus or system in a state to bring back a home screen or other global view for informational purposes, or to switch applications, apps, or files, or to take other action at the global view location. In some embodiments, when a user is in a program or application, the user may perform the "Finger Crunch" gesture with a first hand, in which the fingers of the first hand change from an extended position to a bent position, whereby the system is instructed to return to a home screen or other global view, where other information may be shown.

In some embodiments, if while in the global view, the user then interacts with an items on the home screen (710 in FIG. 7), such as, for example, grasping another application, file, or other item this may allow a preview for that other item to appear (730 in FIG. 7). In some embodiments, if subsequently the user points to the open program (810 in FIG. 8) using the second hand and then opens his "Finger Crunch" first hand, then the system may switch over to the program/application/file at which that was pointed (830 in FIG. 8).

Figure 9:
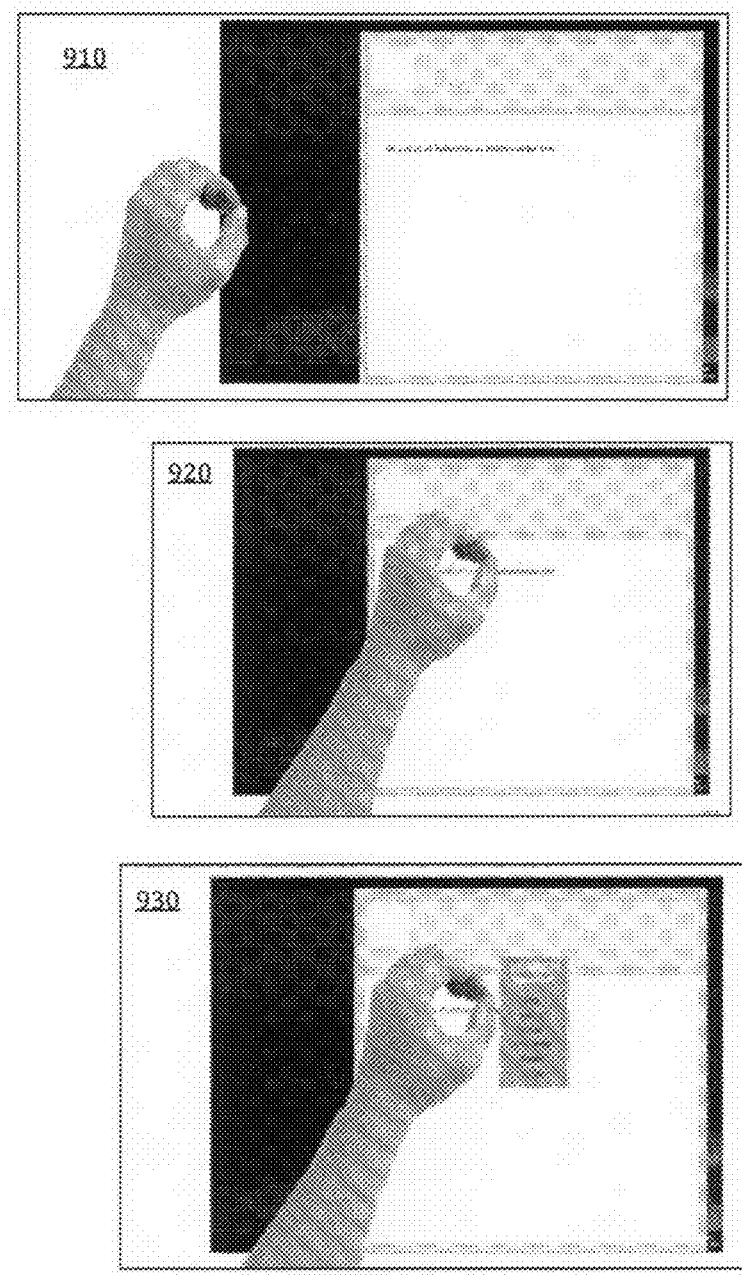
FIGS. 9-11 illustrate an embodiment of an apparatus or system utilizing two-hand coordinated command gestures for searching operations.
Figure 10:
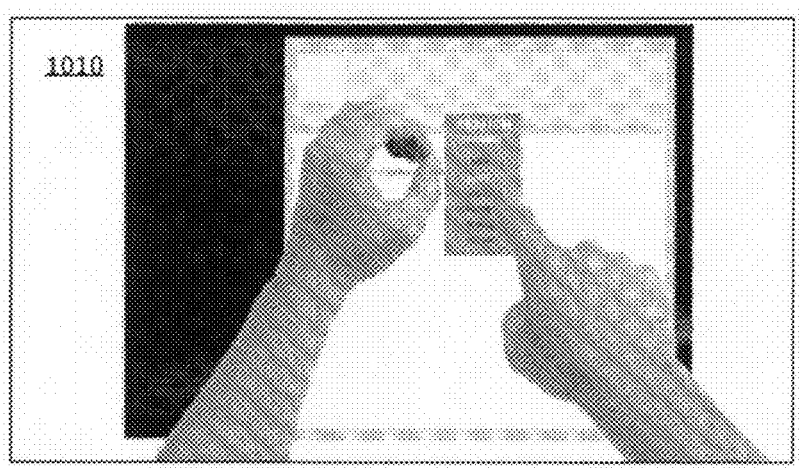
Figure 10:
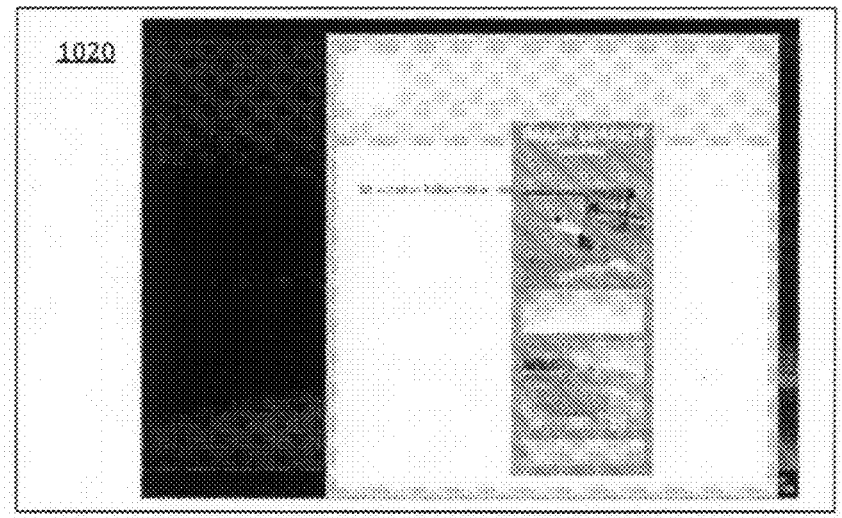
Figure 11:
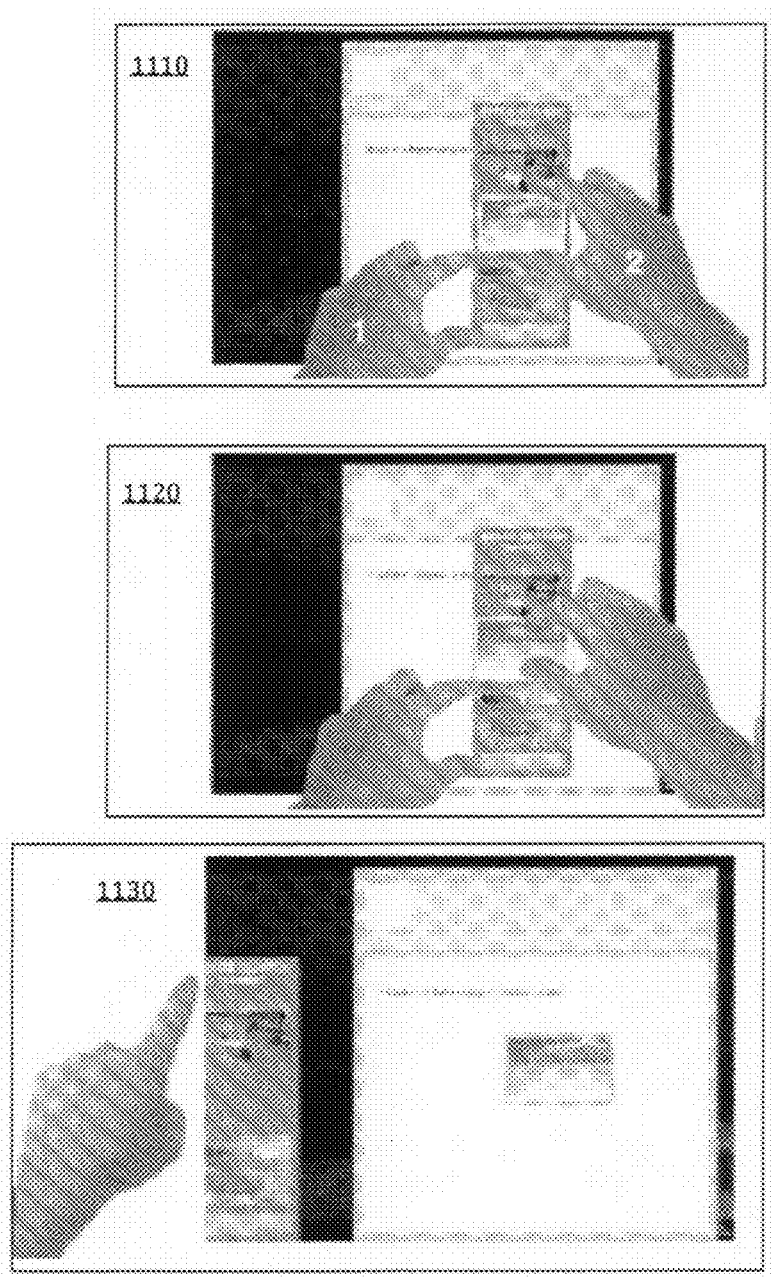

FIGS. 9-11 illustrate an embodiment of an apparatus or system utilizing two-hand coordinated command gestures for searching operations. In some embodiments, a computing system includes a short-cut gesture for initiating search functions. In some embodiments, a natural gesture for this type of function for a user includes using a first (non-dominant) hand to create a looking glass (or magnifying glass) gesture (910 in FIG. 9) by forming a loop with the thumb and one or more other fingers for the hand. In some embodiments, when a looking glass gesture is placed over an item displayed on the display screen (920 in FIG. 9), on-screen feedback is provided to the user indicating that a search state or environment has been entered into. For example, when the user selects a word with the hand performing the looking glass gesture, the selected word highlights and a search is then conducted for information on that word.

In some embodiments, when a word or other item is highlighted, additional search options become visible such as web, image, local, travel, or other options. In some embodiments, the system may provide options in the form of a menu or other format for further action (930 in FIG. 9). In some embodiments, a user may utilize the user's second hand (such as the user's dominant hand) in coordination with the first hand to select an item in the search results (1010 in FIG. 10). With the second hand, the user may further specify what type of search is of interest. In some embodiments, upon, for example, removing both hands, the selected search criteria would be selected and the user obtains the requested search information (1020 in FIG. 10).

In some embodiments, a user may then interact with the search results and, for example, may utilize the search results in the program from which the search initiated, or may utilize the results for other purposes. For example, the use may pin the results with a first hand and select an item (such as an illustrated photographic image) with a second hand (1110 and 1120 in FIG. 11), and then copy the result, such as, for example, copying the result to a document that was the source of the search (1130 in FIG. 11).

Figure 12:
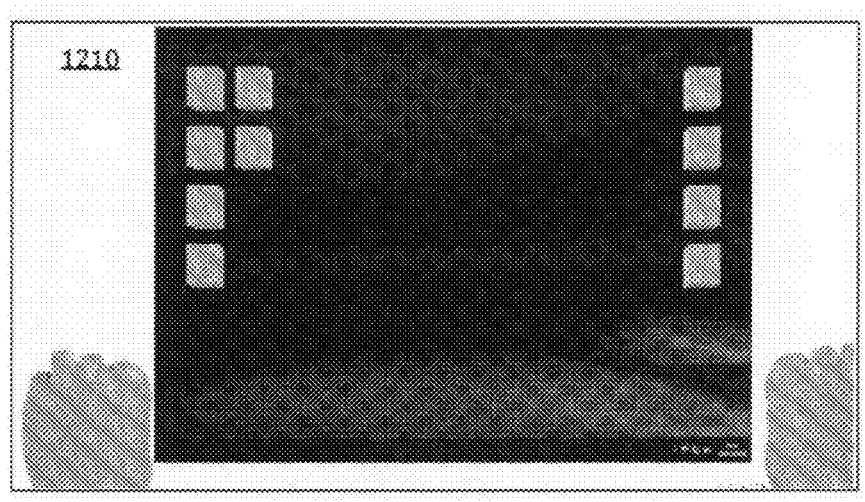
FIG. 12 illustrate an embodiment of an apparatus or system utilizing simultaneous two-hand command gestures.

FIG. 12 illustrate an embodiment of an apparatus or system utilizing simultaneous two-hand command gestures. In some embodiments, an apparatus, system, or process further provides for gesture recognition include one or more single-action two-hand command gestures, wherein a computing system interprets a gesture comprising two hands performing a gesture simultaneously as a particular operation. In some embodiments, the use of two hands simultaneously allows for a user to quickly request a universal action, where such action may be quickly and accurately interpreted by the system through the use of the simultaneous gesture with both hands of the user.

In some embodiments, a cooperative single-action two-hand command gesture utilized in a computing system environment is a "Reset Gesture" that cancels all pending actions and takes the user back to a fresh home screen. In some embodiments, a reset gesture utilizes a "Two Closed Fists" gesture, as illustrated as 1210 in FIG. 12. An alternative implementation may utilize a single first gesture for reset, but such action may create additional risk of inadvertent reset in comparison with a simultaneous two-hand gesture. In some embodiments, an alternative two-hand gesture (not illustrated here) involves performing both hands open with open palms toward the screen (analogous to "giving up" or surrendering) to indicate an intention for a reset operation.

In some embodiments, the two-hand reset gesture will instruct the computing system to "undo" current actions and reset back to the home screen.

Figure 13:
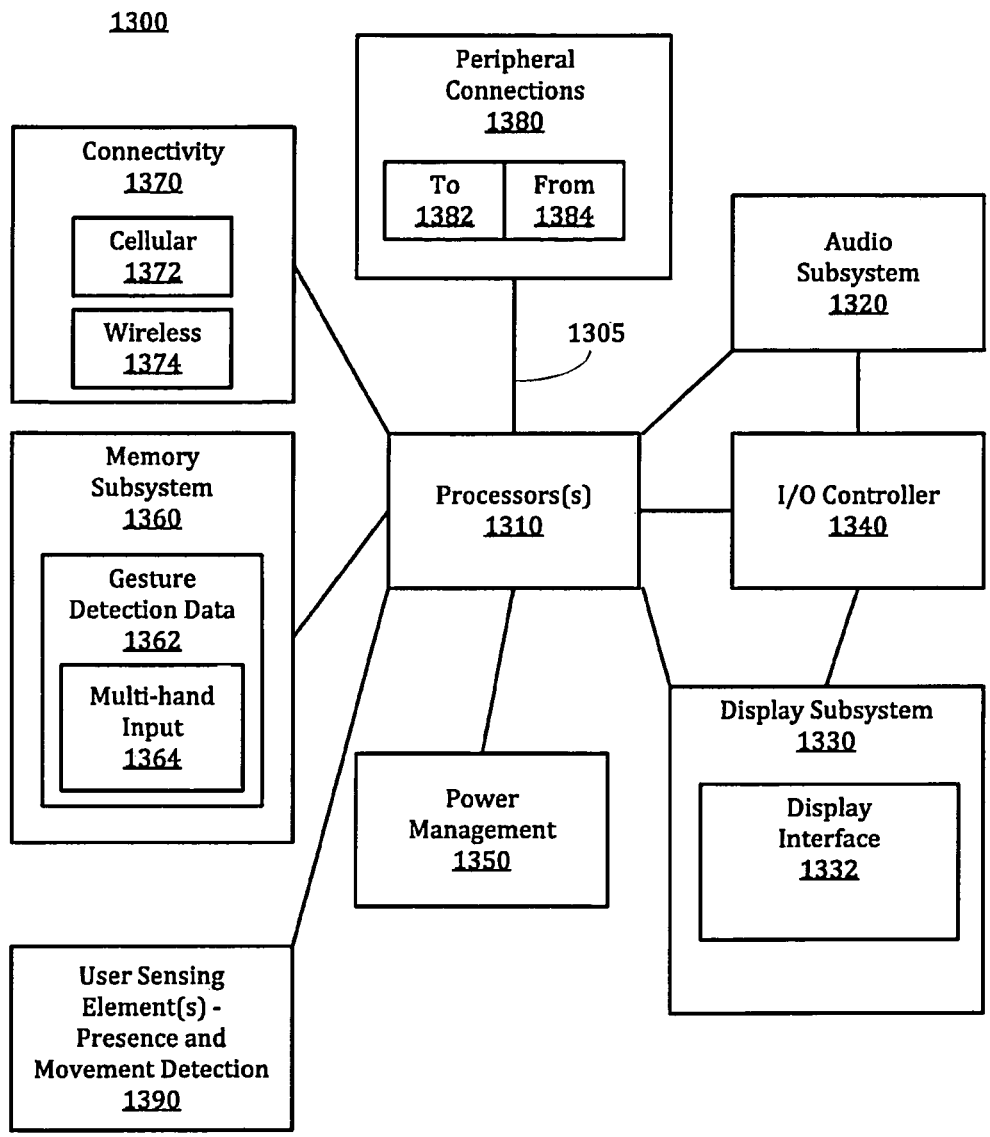
FIG. 13 is a block diagram to illustrate an embodiment a computing system including a mechanism to handle coordinated two-hand command gestures.

FIG. 13 is a block diagram to illustrate an embodiment a computing system including a mechanism to handle coordinated two-hand command gestures. Computing system 1300 represents any computing device or system utilizing user sensing, including a mobile computing device, such as a laptop computer, computing tablet, a mobile phone or smartphone, a wireless-enabled e-reader, or other wireless mobile device. It will be understood that certain of the components are shown generally, and not all components of such a computing system are shown in computing system 1300. The components may be connected by one or more buses or other connections 1305.

Computing system 1300 includes processor 1310, which performs the primary processing operations of computing system 1300. Processor 1310 can include one or more physical devices, such as microprocessors, application processors, microcontrollers, programmable logic devices, or other processing means. The processing operations performed by processor 1310 include the execution of an operating platform or operating System on which applications, device functions, or both are executed. The processing operations include, for example, operations related to I/O (input/output) with a human user or with other devices, operations related to power management, and operations related to connecting computing system 1300 to another system or device. The processing operations may also include operations related to audio I/O, display I/O, or both. Processors 1310 may include one or more graphics processing units (GPUs), including a GPU used for general-purpose computing on graphics processing units (GPGPU).

In some embodiments, computing system 1300 includes audio subsystem 1320, which represents hardware (such as audio hardware and audio circuits) and software (such as drivers and codecs) components associated with providing audio functions to the computing system. Audio functions can include speaker output, headphone output, or both, as well as microphone input. Devices for such functions can be integrated into computing system 1300, or connected to computing system 1300. In some embodiments, a user interacts with computing system 1300 by providing audio commands that are received and processed by processor 1310.

Display subsystem 1330 represents hardware (for example, display devices) and software (for example, drivers) components that provide a visual display, a tactile display, or combination of displays for a user to interact with the computing system 1300. Display subsystem 1330 includes display interface 1332, which includes the particular screen or hardware device used to, provide a display to a user. In one embodiment, display interface 1332 includes logic separate from processor 1310 to perform at least some processing related to the display. In one embodiment, display subsystem 1330 includes a touchscreen device that provides both output and input to a user.

I/O controller 1340 represents hardware devices and software components related to interaction with a user. I/O controller 1340 can operate to manage hardware that is part of audio subsystem 1320 and hardware that is part of the display subsystem 1330. Additionally, I/O controller 1340 illustrates a connection point for additional devices that connect to computing system 1300 through which a user might interact with the system. For example, devices that can be attached to computing system 1300 might include microphone devices, speaker or stereo systems, video systems or other display device, keyboard or keypad devices, or other I/O devices for use with specific applications such as card readers or other devices.

As mentioned above, I/O controller 1340 can interact with audio subsystem 1320, display subsystem 1330, or both. For example, input through a microphone or other audio device can provide input or commands for one or more applications or functions of computing system 1300. Additionally, audio output can be provided instead of or in addition to display output. In another example, if display subsystem includes a touchscreen, the display device also acts as an input device, which can be at least partially managed by I/O controller 1340. There can also be additional buttons or switches on computing system 1300 to provide I/O functions managed by I/O controller 1340.

In one embodiment, I/O controller 1340 manages devices such as accelerometers, cameras, light sensors or other environmental sensors, or other hardware that can be included in computing system 1300. The input can be part of direct user interaction, as well as providing environmental input to the system to influence its operations (such as filtering for noise, adjusting displays for brightness detection, applying a flash for a camera, or other features).

In one embodiment, computing system 1300 includes power management 1350 that manages battery power usage, charging of the battery, and features related to power saving operation. Memory subsystem 1360 includes memory devices for storing information in computing system 1300. Memory can include nonvolatile (state does not change if power to the memory device is interrupted) memory devices and volatile (state is indeterminate if power to the memory device is interrupted) memory devices. Memory 1360 can store application data, user data, music, photos, documents, or other data, as well as system data (whether long-term or temporary) related to the execution of the applications and functions of system 1300. In particular, memory may include gesture detection data 1362 for use in detecting and interpreting gestures by a user of the computing system 1300. In some embodiments, the system 1300 includes operation utilizing two-hand coordinated command gestures, where the gesture detection data includes data regarding multi-hand input, including two-hand coordinated command gestures.

In some embodiments, computing system 1300 includes one or more user sensing elements 1390 to sense presence and motion, wherein may include one or more cameras or other visual sensing elements, one or more microphones or other audio sensing elements, one or more infrared or other heat sensing elements, or any other element for sensing the presence or movement of a user.

Connectivity 1370 includes hardware devices (such as wireless and wired connectors and communication hardware) and software components (such as drivers and protocol stacks) to enable computing system 1300 to communicate with external devices. The computing system could include separate devices, such as other computing devices, wireless access points or base stations, as well as peripherals such as headsets, printers, or other devices.

Connectivity 1370 can include multiple different types of connectivity. To generalize, computing system 1300 is illustrated with cellular connectivity 1372 and wireless connectivity 1374. Cellular connectivity 1372 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity 1374 refers to wireless connectivity that is not cellular, and can include personal area networks (such as Bluetooth), local area networks (such as WiFi), wide area networks (such as WiMax), or other wireless communication. Connectivity 1370 may include an omnidirectional or directional antenna for transmission of data, reception of data, or both.

Peripheral connections 1380 include hardware interfaces and connectors, as well as software components (for example, drivers and protocol stacks) to make peripheral connections. It will be understood that computing system 1300 could both be a peripheral device ("to" 1382) to other computing devices, as well as have peripheral devices ("from" 1384) connected to it. Computing system 1300 commonly has a "docking" connector to connect to other computing devices for purposes such as managing (such as downloading, uploading, changing, and synchronizing) content on computing system 1300. Additionally, a docking connector can allow computing system 1300 to connect to certain peripherals that allow computing system 1300 to control content output, for example, to audiovisual, or other systems.

In addition to a proprietary docking connector or other proprietary connection hardware, computing system 1300 can make peripheral connections 1380 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

Figure 14:
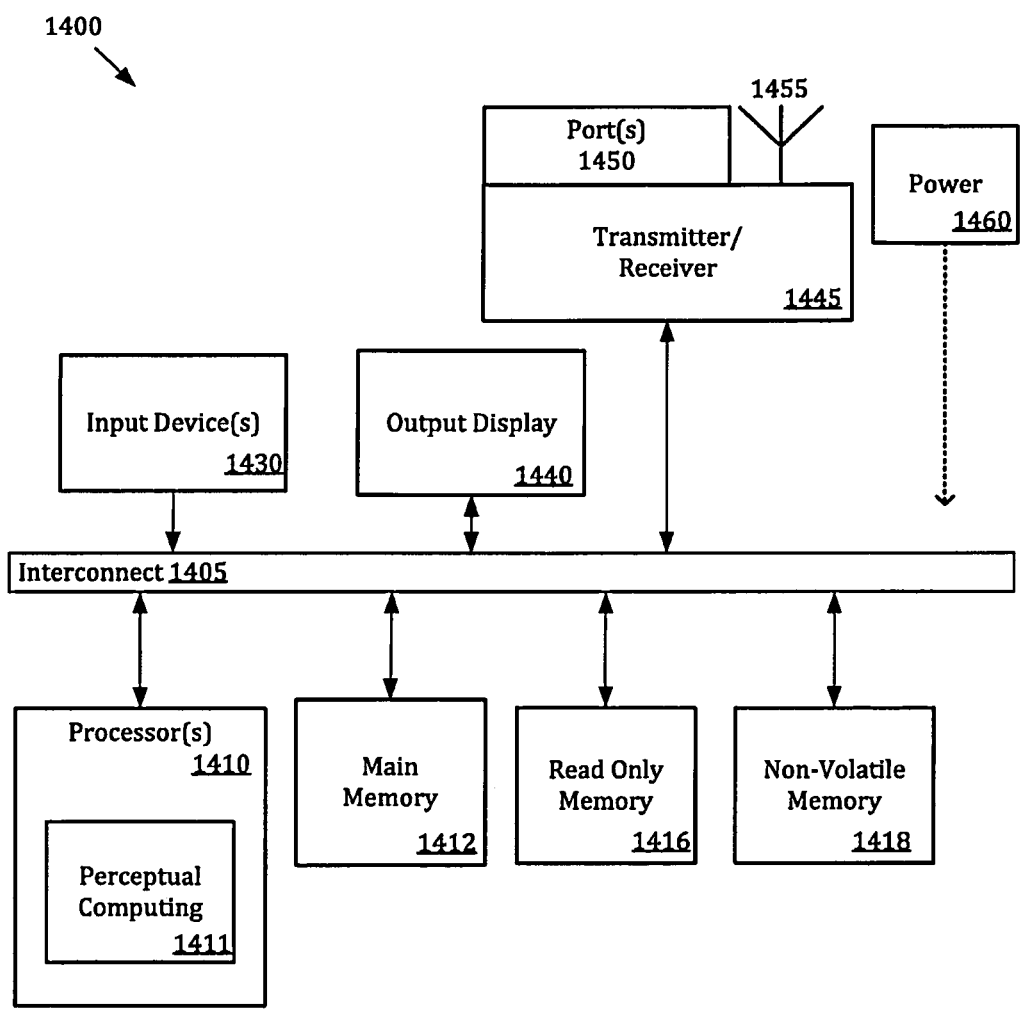
FIG. 14 illustrates an embodiment of a computing system for perceptual computing.

FIG. 14 illustrates an embodiment of a computing system for perceptual computing. The computing system may include a computer, server, game console, or other computing apparatus. In this illustration, certain standard and well-known components that are not germane to the present description are not shown. Under some embodiments, the computing system 1400 comprises an interconnect or crossbar 1405 or other communication means for transmission of data. The computing system 1400 may include a processing means such as one or more processors 1410 coupled with the interconnect 1405 for processing information. The processors 1410 may comprise one or more physical processors and one or more logical processors. The interconnect 1405 is illustrated as a single interconnect for simplicity, but may represent multiple different interconnects or buses and the component connections to such interconnects may vary. The interconnect 1405 shown in FIG. 14 is an abstraction that represents any one or more separate physical buses, point-to-point connections, or both connected by appropriate bridges, adapters, or controllers.

Processing by the one or more processors include processing for perceptual computing 1411, where such processing includes sensing and interpretation of gestures in relation to a virtual boundary of the computing system.

In some embodiments, the computing system 1400 further comprises a random access memory (RAM) or other dynamic storage device or element as a main memory 1412 for storing information and instructions to be executed by the processors 1410. RAM memory includes dynamic random access memory (DRAM), which requires refreshing of memory contents, and static random access memory (SRAM), which does not require refreshing contents, but at increased cost. In some embodiments, main memory may include active storage of applications including a browser application for using in network browsing activities by a user of the computing system. DRAM memory may include synchronous dynamic random access memory (SDRAM), which includes a clock signal to control signals, and extended data-out dynamic random access memory (EDO DRAM). In some embodiments, memory of the system may include certain registers or other special purpose memory.

The computing system 1400 also may comprise a read only memory (ROM) 1416 or other static storage device for storing static information and instructions for the processors 1410. The computing system 1400 may include one or more non-volatile memory elements 1418 for the storage of certain elements.

In some embodiments, the computing system 1400 includes one or more input devices 1430, where the input devices include one or more of a keyboard, mouse, touch pad, voice command recognition, gesture recognition, or other device for providing an input to a computing system.

The computing system 1400 may also be coupled via the interconnect 1405 to an output display 1440. In some embodiments, the display 1440 may include a liquid crystal display (LCD) or any other display technology, for displaying information or content to a user. In some environments, the display 1440 may include a touch-screen that is also utilized as at least a part of an input device. In some environments, the display 1440 may be or may include an audio device, such as a speaker for providing audio information.

One or more transmitters or receivers 1445 may also be coupled to the interconnect 1405. In some embodiments, the computing system 1400 may include one or more ports 1450 for the reception or transmission of data. The computing system 1400 may further include one or more omnidirectional or directional antennas 1455 for the reception of data via radio signals.

The computing system 1400 may also comprise a power device or system 1460, which may comprise a power supply, a battery, a solar cell, a fuel cell, or other system or device for providing or generating power. The power provided by the power device or system 1460 may be distributed as required to elements of the computing system 1400.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs which are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, floppy diskettes, optical disks, compact disk read-only memory (CD-ROM), and magneto-optical disks, read-only memory (ROM), random access memory (RAM), erasable programmable read-only memory (EPROM), electrically-erasable programmable read-only memory (EEPROM), magnet or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the embodiments of the present invention is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the present invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the present invention, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. An apparatus comprising:
    a sensing element to sense a presence and movement of a user of the apparatus performed within a sensing range of the apparatus, the sensing element including a camera to detect command gestures of the user, the sensing range being a range within which the camera can view the user, the sensing element to detect a command gesture by the user performed through space within the sensing range to provide input to the apparatus, wherein detecting a command gesture includes the sensing element to sense position and movement of a first hand and a second hand of the user within the sensing range of the apparatus;
    a processor, wherein operation of the processor includes interpretation of the command gesture of the user within the sensing range and the implementation of actions in response to the command gesture; and
    a display screen to display elements to the user, wherein the display screen may display one or more elements as objects for operation by command gestures;
    wherein the command gesture is a coordinated two-hand command gesture of the user performed by the first hand and the second hand of the user within the sensing range;
    wherein, for the two-hand command gesture, the first hand performs a first gesture within the sensing range to indicate a first operation to place and maintain the apparatus in a first state, the first state including maintaining a display of a plurality of objects on the display screen, and the second hand performs a second gesture within the sensing range to indicate a second coordinated operation, the second operation to operate on one or more of the plurality of objects on the display screen.

2. The apparatus of claim 1, wherein the first gesture to place and maintain the apparatus in the first state includes a gesture of the first hand of the user within the sensing range to provide for pinning the plurality of objects displayed on the display screen in a current location.

3. The apparatus of claim 2, wherein the first gesture of the first hand for the first operation pinning the plurality of objects displayed on the display screen includes a gesture within the sensing range with a thumb and index finger of the first hand in an open position.

4. The apparatus of claim 2, wherein the second operation is a selection of a first object of the plurality of objects displayed on the display screen based on the second gesture of the second hand within the sensing range.

5. The apparatus of claim 1, wherein the second operation is a detailed entry in the current position of the plurality of objects displayed on the display screen using the second gesture of the second hand of the user within the sensing range.

6. The apparatus of claim 1, wherein the first state includes a switch to a different view on the display screen.

7. The apparatus of claim 6, wherein the second operation is a selection of a first object of the plurality of objects in the different view based on the second gesture of the second hand in the sensing range.

8. The apparatus of claim 6, wherein the first gesture of the first hand within the sensing range includes a change of a position of one or more fingers of the first hand from an extended position to a bent position.

9. The apparatus of claim 1, wherein the first state includes a search of a first object of the plurality of objects selected by the first gesture of the first hand of the user within the sensing range.

10. The apparatus of claim 9, wherein the second operation is a selection of a search choice provided by the apparatus.

11. The apparatus of claim 9, wherein the first gesture of the first hand within the sensing range includes formation of a loop with the thumb and one or more of the other fingers of the first hand.

12. The apparatus of claim 1, wherein the camera is one of a time of flight camera or a patterned light camera.

13. The apparatus of claim 1, wherein the sensing range includes space within a virtual boundary of the apparatus.

14. A method comprising:
displaying one or more elements as objects for operation by command gestures of a user for a computing system;
detecting by a sensing element a command gesture of the user performed through space within a sensing range for the computing system, the sensing element including a camera to detect command gestures of the user, the sensing range being a range within which the camera can view the user, wherein detecting a command gesture includes the sensing element to sense position and movement of a first hand and a second hand of the user within the sensing range of the computing system; and
interpreting the command gesture and implementing action in response to the command gesture;
wherein the command gesture is a coordinated two-hand gesture of the user performed by the first hand and the second hand of the user within the sensing range;
wherein, for a two-hand gesture, the first hand provides a first gesture within the sensing range to indicate a first operation to place and maintain the computing system in a first state, the first state including maintaining a display of a plurality of objects on the display screen, and the second hand provides a second gesture within the sensing range to indicate a second coordinated operation in the first state, the second operation to operate on one or more of the plurality of objects on the display screen.

15. The method of claim 14, wherein the first gesture by the first hand to place and maintain the computing system in the first state is a gesture of the first hand of the user within the sensing range to provide for pinning the plurality of objects displayed on the display screen in a current location.

16. The method of claim 14, wherein the first gesture by the first hand of the user within the sensing range is a gesture to switch to a different view on the display screen.

17. The method of claim 14, wherein the first gesture by the first hand of user within the sensing range is a search of a first object of the plurality of objects selected by the first gesture of the first hand of the user.

18. A non-transitory computer-readable storage medium having stored thereon data representing sequences of instructions that, when executed by a processor, cause the processor to perform operations comprising:
displaying one or more elements as objects for operation by command gestures of a user for a computing system;
detecting by a sensing element a command gesture of the user performed through space within a sensing range for the computing system, the sensing element including a camera to detect command gestures of the user, the sensing range being a range within which the camera can view the user, wherein detecting a command gesture includes the sensing element to sense position and movement of a first hand and a second hand of the user within the sensing range of the computing system; and
interpreting the command gesture and implementing action in response to the command gesture;
wherein the command gesture is a coordinated two-hand gesture of the user performed by the first hand and the second hand of the user within the sensing range;
wherein, for a two-hand gesture, the first hand provides a first gesture within the sensing range to indicate a first operation to place and maintain the computing system in a first state, the first state including maintaining a display of a plurality of objects on the display screen, and the second hand provides a second gesture within the sensing range to indicate a second coordinated operation in the first state, the second operation to operate on one or more of the plurality of objects on the display screen.

19. The medium of claim 18, wherein the first gesture by the first hand to place and maintain the computing system in the first state is a gesture of the first hand of the user within the sensing range to provide for pinning the plurality of objects displayed on the display screen in a current location.

20. The medium of claim 18, wherein the first gesture by the first hand of the user within the sensing range is a gesture to switch to a different view on the display screen.

21. The medium of claim 18, wherein the first gesture by the first hand of user within the sensing range is a search of a first object of the plurality of objects selected by the first gesture of the first hand of the user.

* * * * *